US012760684B2

(12) United States Patent

Beutin et al.

(10) Patent No.: US 12,760,684 B2
(45) Date of Patent: Oct. 13, 2026

(54) AIRCRAFT TURBINE ENGINE ASSEMBLY COMPRISING A HOLDER FOR FITTINGS

(71) Applicant: SAFRAN AIRCRAFT ENGINES, Paris (FR)

(72) Inventors: Bruno Albert Beutin, Moissy-Cramayel (FR); Anthony Pierre Guy Delaforge, Moissy-Cramayel (FR); Zoltan Zsiga, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/257,830

(22) PCT Filed: Dec. 15, 2021

(86) PCT No.: PCT/FR2021/052341

§ 371 (c)(1),
(2) Date: Jun. 15, 2023

(87) PCT Pub. No.: WO2022/129788

PCT Pub. Date: Jun. 23, 2022

(65) Prior Publication Data

US 2024/0052788 A1 Feb. 15, 2024

(30) Foreign Application Priority Data

Dec. 15, 2020 (FR) ...................................... 2013272

(51) Int. Cl.
*F02C 7/36* (2006.01)
*F01D 25/24* (2006.01)
(Continued)

(52) U.S. Cl.
CPC ................ *F02C 7/36* (2013.01); *F01D 25/24* (2013.01); *F02C 7/20* (2013.01); *F02C 7/32* (2013.01)

(58) Field of Classification Search
CPC ...... F02C 7/36; F02C 3/10; F02C 7/20; F02C 7/32; F02K 3/06; F01D 25/24
See application file for complete search history.

(56) References Cited

U.S. PATENT DOCUMENTS 7,500,365 B2 * 3/2009 Suciu ........................ F02C 7/36 60/802
9,500,133 B2 * 11/2016 Davis ...................... F01D 25/28
(Continued)

FOREIGN PATENT DOCUMENTS

EP 2696057 A1 2/2014
FR 2946091 A1 12/2010
(Continued)

OTHER PUBLICATIONS

French Search Report issued in French Application No. 20 13272, mailed on Aug. 10, 2021.
(Continued)

*Primary Examiner* — Devon C Kramer
*Assistant Examiner* — Henry Ng
(74) *Attorney, Agent, or Firm* — Bookoff McAndrews, PLLC

(57) ABSTRACT

Assembly for an aircraft turbine engine, comprising an intermediate casing hub, an accessory gearbox, and a transfer case including a power transmission shaft configured to transmit mechanical power, taken off an engine shaft of the turbine engine, to at least one accessory mounted on the accessory gearbox, in which the transfer case comprises a
(Continued)

structural element surrounding the power transmission shaft and rigidly attaching the accessory gearbox to the intermediate casing hub.

20 Claims, 3 Drawing Sheets

(51) Int. Cl.
*F02C 7/20* (2006.01)
*F02C 7/32* (2006.01)

(56) References Cited

U.S. PATENT DOCUMENTS

| | | | | |
|---|---|---|---|---|
| 9,562,477 | B2 * | 2/2017 | Beier | B64D 27/40 |
| 9,765,696 | B2 * | 9/2017 | Beier | G01M 15/14 |
| 2005/0172608 | A1 * | 8/2005 | Lapergue | F02K 3/06 60/226.1 |
| 2010/0019626 | A1 * | 1/2010 | Stout | H02K 3/50 310/214 |
| 2013/0160459 | A1 * | 6/2013 | Thies | F02C 7/20 29/888.02 |
| 2014/0013769 | A1 * | 1/2014 | Martin | F01D 25/28 29/888.012 |
| 2016/0083101 | A1 * | 3/2016 | Ronski | B64D 27/40 432/63 |
| 2016/0138476 | A1 * | 5/2016 | Lemarchand | F01D 25/162 415/213.1 |
| 2016/0169118 | A1 * | 6/2016 | Duong | F02C 7/32 29/893.1 |
| 2016/0215654 | A1 * | 7/2016 | Ancuta | F01D 25/28 |
| 2016/0319748 | A1 * | 11/2016 | Miller | F02C 3/04 |
| 2017/0314469 | A1 * | 11/2017 | Roever | F02C 7/36 |
| 2018/0186462 | A1 * | 7/2018 | Brochard | B64D 27/404 |
| 2018/0306121 | A1 * | 10/2018 | Curlier | F01D 15/12 |
| 2019/0285029 | A1 * | 9/2019 | Nick | B64D 27/404 |
| 2020/0325827 | A1 * | 10/2020 | Bewick | F02C 7/222 |
| 2020/0400078 | A1 * | 12/2020 | Hanrahan | F16H 48/08 |
| 2021/0102499 | A1 * | 4/2021 | Leque | F16H 3/46 |
| 2021/0404387 | A1 * | 12/2021 | Venter | F02C 7/32 |
| 2022/0065171 | A1 * | 3/2022 | Stretton | F02C 7/32 |
| 2022/0099031 | A1 * | 3/2022 | Miller | F01D 25/24 |
| 2022/0106911 | A1 * | 4/2022 | Jacon | B64D 29/00 |
| 2022/0178265 | A1 * | 6/2022 | Klaus | F02K 3/02 |

FOREIGN PATENT DOCUMENTS

| | | | |
|---|---|---|---|
| FR | 2952672 | A1 | 5/2011 |
| FR | 3007458 | A1 | 12/2014 |
| FR | 3012845 | A1 | 5/2015 |

OTHER PUBLICATIONS

International Search Report and Written Opinion issued in International Application No. PCT/FR2021/052341, mailed on Apr. 28, 2022.

* cited by examiner

[Fig.1]
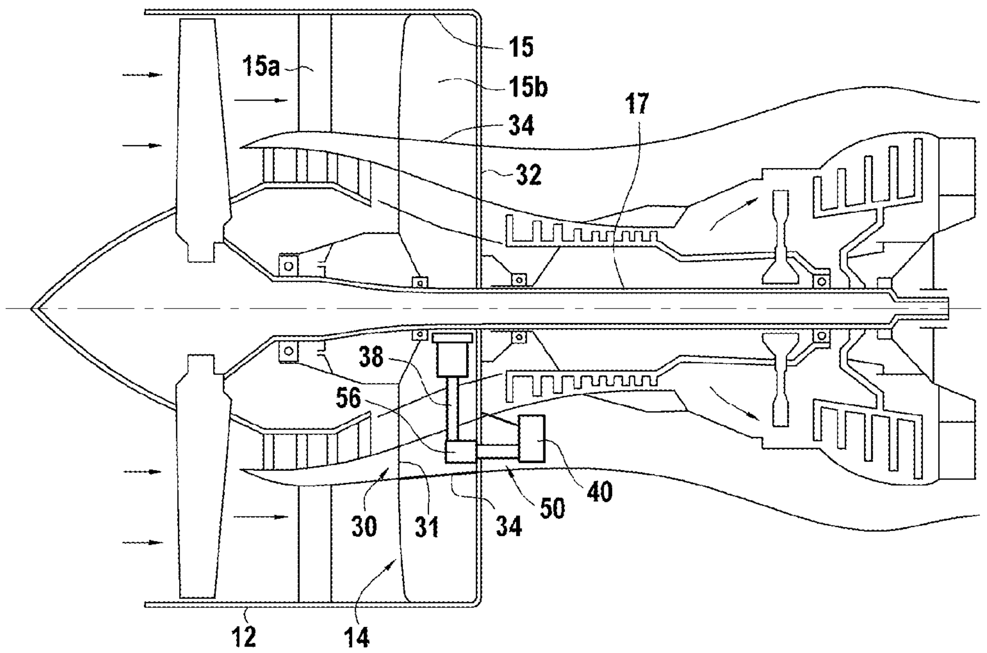

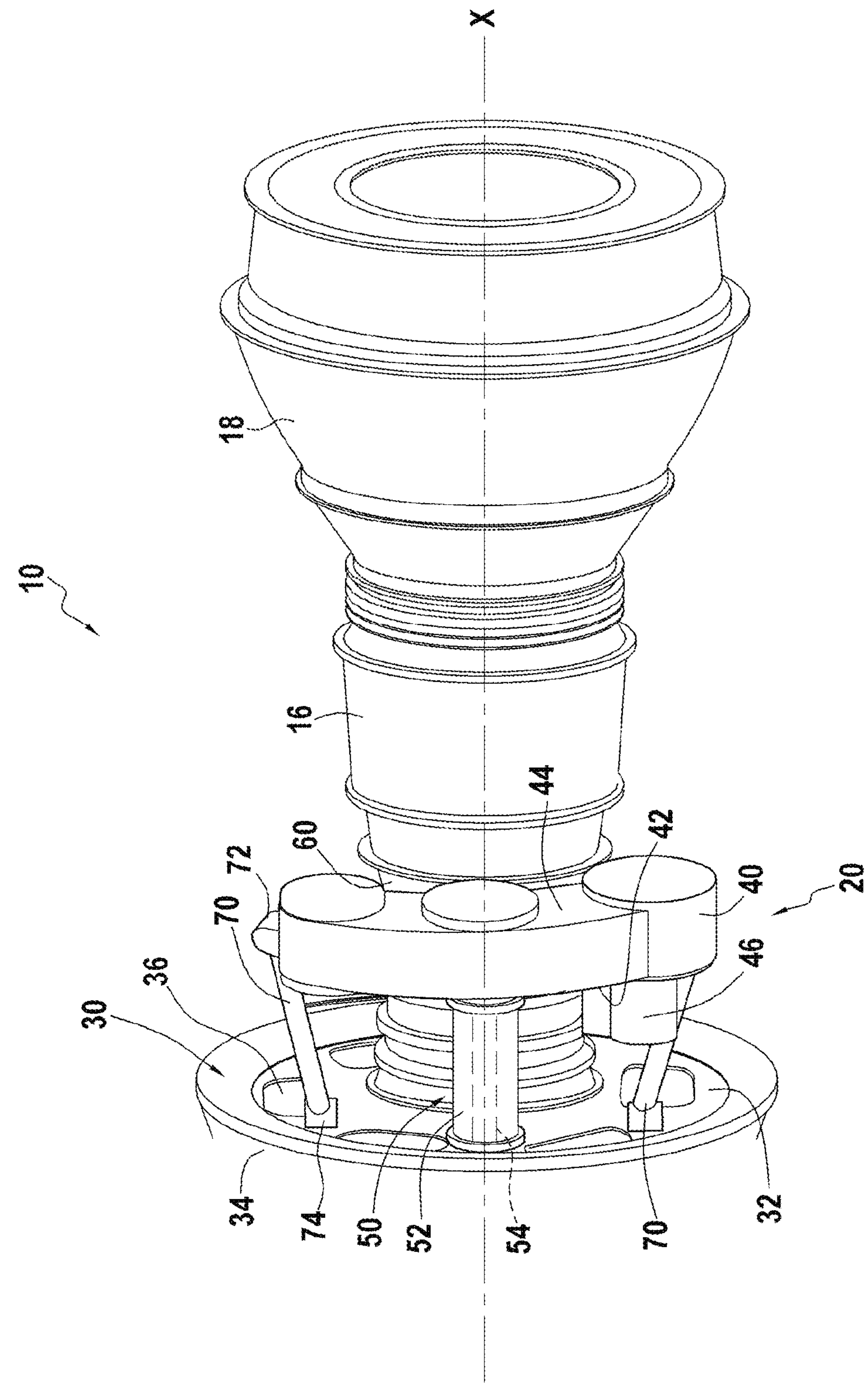
[Fig. 2]

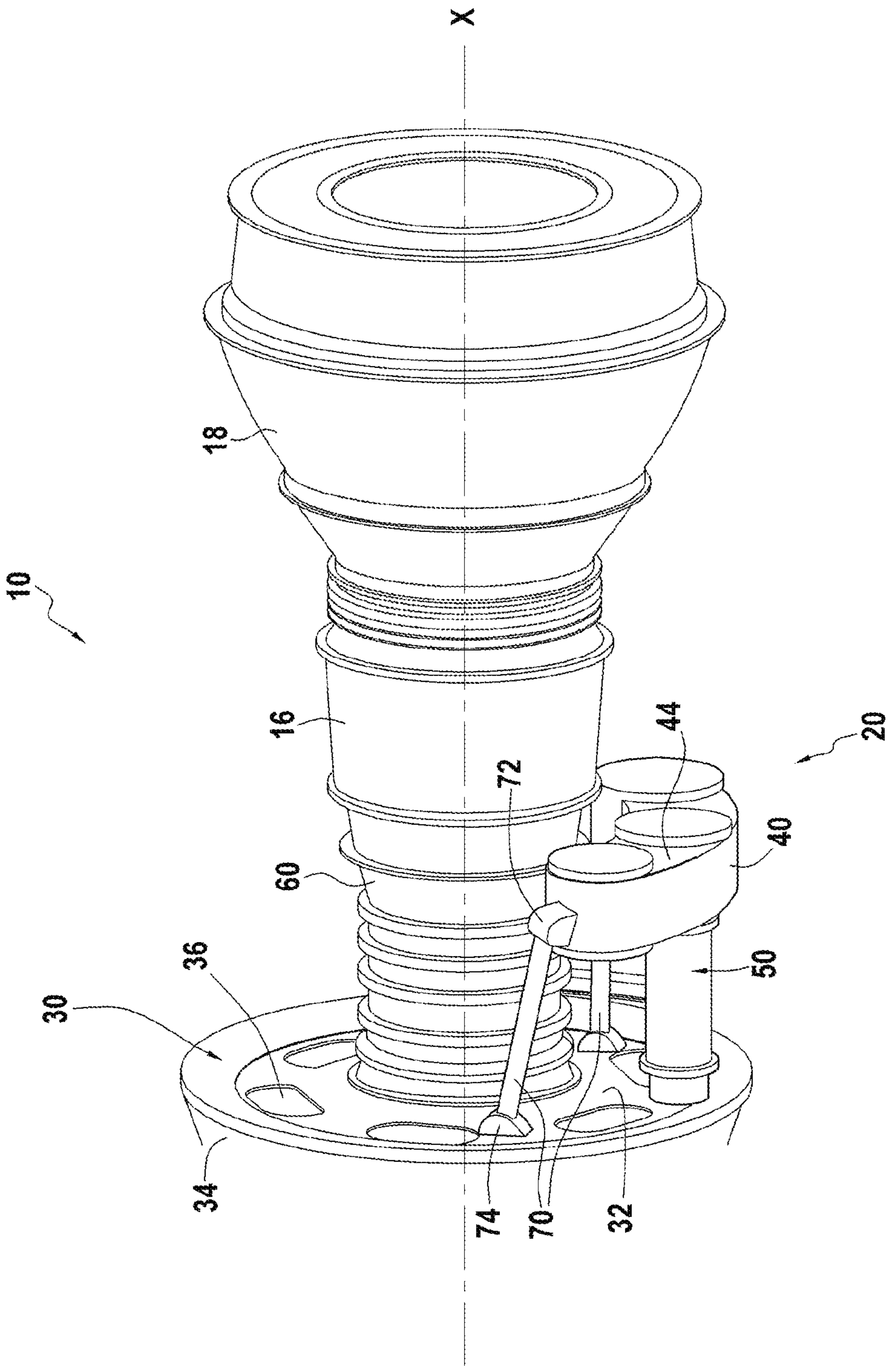
[Fig. 3]

AIRCRAFT TURBINE ENGINE ASSEMBLY COMPRISING A HOLDER FOR FITTINGS

CROSS-REFERENCE TO RELATED APPLICATIONS

This is a National Stage Application under 35 U.S.C. § 371 of International Application No. PCT/FR2021/052341, filed Dec. 15, 2021, now published as WO 2022/129788 A1, which claims priority to French Patent Application No. 2013272, filed on Dec. 15, 2020.

TECHNICAL FIELD

The present disclosure relates to the general field of turbine engines, in particular aeronautical turbine engines. The present disclosure relates to the mounting of an accessory gearbox in a turbine engine of this type, and more particularly to an aircraft turbine engine comprising an accessory gearbox.

PRIOR ART

In a turbine engine, used for example for the propulsion of an aircraft such as an airplane or a helicopter, equipment and accessories such as pumps for the production of hydraulic power, fuel feed and lubrication, electrical generators for the production of electrical power, etc. are grouped on an accessory gearbox commonly called an accessory housing or gearbox, or AGB for Accessory Gearbox. Such a gearbox generally has one or more gear trains which are driven in rotation by a power take-off from a shaft of the turbine engine, and to which the different accessories are coupled.

For various reasons, the accessory gearbox can be provided around a compressor of the turbine engine. Under these circumstances, it is then natural to attach the accessory gearbox at least partially to the casing of the compressor. However, this can lead to a phenomenon of ovalization of the casing, which strains the performance of the compressor. Confronted with this problem, patent application FR2 952 672 by the Applicant proposes suspending the accessory gearbox from the beam (also called a pylon) located above the compressor casing and by which the turbojet is hung from the wing of an airplane, in one configuration where the suspension of the turbojet from this beam occurs at a hub of the intermediate casing of the engine. Although it gives satisfaction in certain cases, a solution of this type can be difficult to implement, particularly when the turbojet is hung on the airplane by another system, or when the accessory gearbox is located below the compressor casing and does not extend above this casing. In addition, this solution necessitates certain connections which can be complex or cumbersome.

DISCLOSURE OF THE INVENTION

The present disclosure intends to correct these disadvantages, at least partially.

To this end, the present disclosure relates to an assembly for an aircraft turbine engine, comprising an intermediate casing hub, an accessory gearbox, and a transfer case including a power transmission shaft configured to transmit mechanical power taken off an engine shaft of the turbine engine, to at least one accessory mounted on the accessory gearbox, in which the transfer case comprises a structural element surrounding the power transmission shaft and rigidly attaching the accessory gearbox to the intermediate casing hub.

What is called the axis of the turbine engine is an axis of rotation of a rotor of the turbine engine, for example a compressor rotor. The axial direction corresponds to the direction of the axis of the turbine engine and a radial direction is a direction perpendicular to this axis and intersecting this axis. Likewise, an axial plane is a plane containing the axis of the turbine engine and a radial plane is a plane perpendicular to this axis. A circumference extends like a circle belonging to a radial plane and the center of which belongs to the axis of the turbine engine. A tangential or circumferential direction is a direction tangent to a circumference; it is perpendicular to the axis of the turbine engine but does not pass through the axis.

Unless otherwise stated, the adjectives interior and exterior are used with reference to a radial direction so that the interior portion of an element is closer, in a radial direction, to the axis of the turbine engine than the exterior portion of the same element.

Finally, unless otherwise stated, the terms upstream and downstream are used with reference to the overall direction of flow in a turbine engine, namely from the compressor to the turbine.

In a turbine engine, the intermediate casing is located upstream of the compressor casing, possibly upstream of the high-pressure compressor casing (and optionally downstream of the low-pressure compressor casing) when the turbine engine comprises several compressors. When the turbine engine comprises a fan, the intermediate casing is located downstream of the retention casing of the fan, which is positioned annularly around the fan.

The interior casing hub designates a radially internal part of the intermediate casing. In a dual flow turbine engine, the intermediate casing hub can designate the portion of the intermediate casing which separates the primary flow from the secondary flow. The role of the intermediate casing hub is to allow having a continuity of structure, between the primary flow and the secondary flow, to cause forces to be transferred toward the upstream suspensions of the turbine engine. In addition, the intermediate casing hub may serve to attach the clevises of the push-pull links, the discharge outlets of the low-pressure air compressor and different accessories such as actuators, probes, etc.

The transfer case, commonly called TGB (for "Transfer Gearbox") houses at least in part the power transmission shaft, also called a transfer shaft, configured to transmit mechanical power taken off an engine shaft, for example a shaft of the high pressure or low pressure spool of the turbine engine, to the accessory gearbox. The kinematic connection between the power transmission shaft and the engine shaft may take place via a gear train or by means of a shaft, particularly a radial shaft. Thus, mechanical power can be transmitted to at least one accessory mounted on the accessory gearbox in order to drive a movable part of the accessory in rotation, generally by means of gear trains provided between the power transmission shaft and the accessory. The transfer case therefore extends between the intermediate casing hub, which partially houses said engine shaft and possibly the radial shaft, and the accessory gearbox.

The assembly for an aircraft turbine engine according to the present disclosure uses the transfer case cleverly, by including in it a structural element in order to rigidly attach the accessory gearbox to the intermediate casing hub, which allows dispensing with an attachment of the accessory gearbox both to a compressor casing and to a suspension beam on an airplane wing. A structural element is an element configured to fulfill a role of structural support and force transfer. In this case, the structural element allows the autonomous attachment of the accessory gearbox to the intermediate casing hub, even if, as will be seen later, other elements may intervene to transfer the forces according to certain degrees of freedom. In other words, the structural element is such that without this element, the accessory gearbox would not be rigidly attached to the intermediate casing hub.

Due to the fact that the transfer case comprises a structural element rigidly attaching the accessory gearbox to the intermediate casing hub, the accessory gearbox is suitable for any type of aircraft turbine engine without necessitating the addition of a beam, and attachments of the accessory gearbox are also simplified, which opens up freedom of design for other aspects of the turbine engine.

In some embodiments, the accessory gearbox is formed by a housing which has an upstream face situated downstream of the intermediate casing hub, and the structural element is rigidly attached to said upstream face. Attachment via the structural element is therefore simple and robust.

In some embodiments, the assembly also comprises two arms connecting the accessory gearbox to the intermediate casing hub. These arms allow transferring mainly the moments about three orthogonal axes, these moments being able to become significant when the accessory gearbox is dimensioned to carry at least three accessories, while the structural element may be configured to transfer the forces along said three axes. Thus, the six degrees of freedom of the accessory gearbox are properly taken up.

In some embodiments, the arms are provided on either side of the structural element. This distributes the force transfer between the two arms.

In some embodiments, the assembly is bereft of other attachments between the accessory gearbox and the intermediate casing hub than the structural element and said two arms. The number of attachments of the accessory gearbox to the intermediate casing hub is therefore minimized, which opens still further design freedoms for other aspects of the turbine engine.

In some embodiments, at least one of the two arms is configured to transfer forces along the axis of the arm (in tension and/or compression).

More particularly, in some embodiments, at least one of the two arms is attached to the intermediate casing hub and/or to the accessory gearbox in an articulated manner so as to transfer forces only along the axis of the arms (in tension and/or compression). An articulation may comprise two parts in mechanical motion with respect to one another, in which case the arm in question may be a link, for example a swiveled link, and/or comprise an elastically deformable part in order to allow a certain movement of the arm, which may then be a simple beam, with respect to the intermediate casing hub and/or the accessory gearbox.

The structural element and the two arms attached in an articulated manner are an example of the aforementioned isostatic (statically determinate) attachment, but other examples are contemplated. For example, it is possible to use additional arms if they have sufficient degrees of freedom to not make the connection statically indeterminate.

In some embodiments, the structural element is formed by an envelope of the transfer case. The envelope may surround the power transmission shaft over at least part of the length of said shaft. The envelope may be a tubular element, or cylindrical with any type of cross section, optionally circular. The envelope may be an exterior housing of the transfer case, configured to house the rest of the transfer case.

In some embodiments, the power transmission shaft extends substantially perpendicular to the upstream face of the accessory gearbox.

In some embodiments, the upstream face of the accessory gearbox is downstream of the intermediate casing hub. In particular, the upstream face of the accessory gearbox may be at a certain distance downstream of the intermediate casing hub, in order to free the location for mounting accessories on the upstream face of the accessory gearbox. In this manner, the accessories can be better distributed over the accessory gearbox. The upstream face may be transverse to the axis of the turbine engine.

Thus, in some embodiments, the assembly for an aircraft turbine engine comprises at least one accessory mounted on the upstream face of the accessory gearbox. Said accessory is, of course, distinct from the transfer case.

Said accessory may have an axial dimension less than the distance (particularly axial) between said upstream face and a downstream annular flange of the intermediate casing hub.

In addition, the accessory gearbox may be mounted so as to be located axially, in the turbine engine, at a compressor casing. In this case, accessibility and maintenance are unchanged for the operators, despite the change in attachment.

In some embodiments, the attachment of the accessory gearbox to the intermediate casing hub is statically determinate. Consequently, the dimensioning of the assembly is facilitated and the attachment does not necessitate any adjustment during its assembly.

In some embodiments, the aircraft turbine engine comprises a compressor casing, the compressor casing having a relatively small diameter compared to the diameter of the fan or of the propeller. For example, the diameter of the compressor casing may be equal to the inner diameter of the intermediate casing hub at its attachment to the intermediate casing hub. Compressor casings of this type, relatively small compared to existing aircraft turbine engines, are particularly subject to the phenomenon of ovalization, and bulk is a particularly acute problem in the corresponding turbine engines. The mode of attachment proposed in the present disclosure is therefore particularly advantageous in this context.

In some embodiments, the accessory gearbox is attached to the intermediate casing hub so as to be mostly located, in the operating position, below an axis of the intermediate casing hub.

The operating position is a position in which the assembly for a turbine engine is integrated into a turbine engine, itself assembled to an aircraft. In this position, at least 50% of the volume of the accessory gearbox is located below the axis of the intermediate casing hub. Such situations are encountered when the accessory gearbox is said to be "mounted at six o'clock" (6 h), for example, referring to an imaginary clock in which the 12 o'clock-6 o'clock axis is aligned with the vertical, 12 o'clock being at the top and 6 o'clock at the bottom. The accessory gearbox may also be mounted at 5 o'clock, at 7 o'clock, etc. The reference point may be a center of gravity of the accessory gearbox, possibly provided with its equipment and accessories.

In some embodiments, the accessory gearbox extends along a portion of a ring. The accessory gearbox may therefore be provided as close as possible to the main axis, around the engine compartment, so as to retain a compact turbine engine. The portion of a ring may be a circular arc, centered or not on the axis of the turbine engine.

In some embodiments, the intermediate casing hub comprises a downstream annular flange to which the structural element is attached, and the transfer case comprises an angle gearbox arranged in the intermediate casing hub upstream of the downstream annular flange, said angle gearbox connecting the power transmission shaft to the engine shaft of the turbine engine by means of a radial shaft of the turbine engine. The angle gearbox may allow the transmission of mechanical power between the radial shaft and the power transmission shaft. The downstream annular flange may be the same as that mentioned previously.

In some embodiments, the ring portion covers an angular sector smaller than 180°.

The present disclosure also relates to an aircraft turbine engine comprising an assembly according to any one of the embodiments previously defined. The aircraft may, in particular, be an airplane or a helicopter. The turbine engine may be a turbojet, a turboprop, an auxiliary power unit (commonly called an APU), etc.

In some embodiments, the aircraft turbine engine comprises, downstream of the intermediate casing, a compressor casing and a combustion chamber casing, and the assembly previously described is bereft of attachment between the accessory gearbox and the compressor casing, and bereft of attachment between the accessory gearbox and the combustion chamber casing. The performance of the turbine engine is thus retained.

BRIEF DESCRIPTION OF THE DRAWINGS

Other features and advantages of the object of the present disclosure will be revealed by the following description of embodiments, given by way of non-limiting examples with reference to the appended figures.

FIG. 1 is a schematic cross-section of an aircraft turbine engine comprising an assembly according to a first embodiment.

FIG. 2 is a bottom view, in perspective, of a portion of the aircraft turbine engine according to the first embodiment.

FIG. 3 is a side view, in the operating position, of the turbine engine portion of FIG. 2.

DETAILED DESCRIPTION

FIG. 1 shows in cross-section, in a simplified manner, a turbine engine 10 according to one embodiment. FIGS. 2 and 3 show a portion of the turbine engine 10 in perspective, seen from below and from the side, respectively. The turbine engine 10 is in this case a two-spool, double flow turbojet, but the present disclosure extends to other types of turbine engines, as mentioned previously. The turbine engine 10, or a turbine engine of another type, may be mounted below the wing of an aircraft, on the wing or even at the rear of the fuselage of the aircraft.

The turbine engine 10 extends generally along a main axis X forming the axis of rotation of at least part of its rotors. The turbine engine 10 may comprise, from upstream to downstream, a fan retaining casing 12, an intermediate casing 14, a compressor casing 60, a combustion chamber casing 16 and a turbine casing 18. If necessary, some of these casings may be divided into several sections, for example, the turbine casing 18 may comprise a high-pressure turbine casing, an inter-turbine casing and a low-pressure turbine casing.

The different casings may be annular, even axisymmetric, and centered on the axis X.

The intermediate casing 14 comprises an external shell 15 and an intermediate casing hub 30. The intermediate casing hub 30 may be connected to the external shell 15 by straighteners 15*a* (commonly called OGV for "Outlet Guide Vanes") for straightening the secondary flow originating in the fan, as well as by structural arms 15*b*.

The intermediate casing hub 30 may form a separation between one stream, called primary, configured to guide the primary flow passing through the core of the turbine engine and intended to participate in combustion and in driving at least one turbine, and a stream called secondary, configured to guide the secondary flow passing by the OGV 15*a* to generate most of the thrust of the turbine engine 10.

In this case, the intermediate casing hub 30 comprises a downstream annular flange 32 extending radially toward the interior from a downstream part of a frusto-conical portion 34. The frusto-conical portion 34 may be, at least in its downstream part, substantially concentric with the external shell 15 and, in the particular case, axisymmetric around the main axis X.

The intermediate casing hub 30 may also comprise, here in the downstream flange 32, one or more openings 36 for the passage of discharge outlets of the compressor, particularly the low-pressure compressor. These outlets are commonly called VBV (for "Variable Bleed Valve") outlets. In this case, the openings 36 are oval. The openings 36 may be arranged alongside one another along a circumference.

The intermediate casing hub 30 may be made of metal, for example of titanium, of steel, of aluminum or of an alloy comprising one or more of these metals.

The intermediate casing hub 30 may also comprise an upstream flange 31. In this case, the annular upstream flange 31 extends radially toward the interior from an upstream part of the frusto-conical portion 34. Located between the upstream flange 31 and the downstream flange 32 are one or more hollow structures, extending for example in the continuity of arms which pass through the primary stream, and optionally in the continuity of the structural arms 15*b*, as illustrated. These hollow structures allow the passage of utilities, such as lubrication circuits, means for measuring speed, etc., but also a radial shaft 38, the role of which will be described hereinafter.

Within the turbine engine 10, an assembly for an aircraft turbine engine 20 comprises a previously mentioned intermediate casing hub 30, but also an accessory gearbox 40.

FIGS. 2 and 3 show that the accessory gearbox 40 extends along a portion of a ring, here around the main axis X. In this embodiment, the ring portion covers an angular sector smaller than 180°, in this case smaller than 120°.

The accessory gearbox 40 may be formed by a housing which has an upstream face 42 turned toward the intermediate casing hub 30, and an opposite face called the downstream face 44, turned toward the downstream side of the turbine engine, for example toward the turbine casing 18. The upstream face 42 and/or the downstream face 44 may be substantially flat, and/or extend transversely to the main axis X, as illustrated.

It is noted at once that the upstream face 42 is downstream of the intermediate casing hub 30, due to the arrangements which will be detailed hereinafter.

Moreover, as indicated previously, the accessory gearbox 40 may enclose one or more gear trains (not shown) which are driven in rotation by a power take-off from an engine shaft 17 (for example the shaft of the high-pressure spool) of the turbine engine 10. One or more accessories may be mounted on the accessory gearbox 40 and may each have a drive shaft which is coupled to one of the gear trains of the accessory gearbox 40. These drive shafts, not shown in the figures, may extend in a direction substantially parallel to the main axis X. Among these accessories, it is possible to provide one or more elements among the following, in one or more copies: an electric generator to supply electrical power to the aircraft, an alternator to supply electrical current to electrical accessories of the turbine engine, a starter for starting the turbine engine, a hydraulic pump to supply hydraulic power to the aircraft, a fuel pump and a lubrication pump. Of course, other accessories than those mentioned here may be mounted on the accessory gearbox 40.

By way of an example, an accessory 46 is shown which here is mounted on the upstream face 42 of the accessory gearbox 40. However, an accessory of this type could also be mounted on the downstream face 44.

Moreover, the assembly for an aircraft turbine engine 20 comprises a transfer case 50 including a power transmission shaft 54 configured to transmit mechanical power, taken off an engine shaft 17 of the turbine engine, to at least one accessory mounted on the accessory gearbox, possibly via the gear trains mentioned previously.

The power transmission shaft 54 may take mechanical power off the engine shaft 17 by means of an intermediate shaft called the radial shaft 38, due to its positioning generally in a radial direction of the turbine engine 10. If necessary, the transfer case 50 may include an angle gearbox 56 forming a kinematic connection between the radial shaft 38 and the power transmission shaft 54. For example, the angle gearbox 56 may comprise a coupling of conical gears. As illustrated in FIG. 1, the angle gearbox 56 may be located between the upstream flange 31 and the downstream flange 32 of the intermediate casing hub 30.

Moreover, as indicated previously, the transfer case 50 comprises a structural element 52 rigidly attaching the accessory gearbox 40 to the intermediate casing hub 30. In this case, the structural element 52 is formed by an envelope of the transfer case 50 (hereinafter also called the "envelope 52"), said envelope 52 surrounding the power transmission shaft 54, as shown by FIGS. 2 and 3.

Thus, in this embodiment, the envelope 52 of the transfer case 50 is reinforced so as to be able to support the weight of the accessory gearbox 40 and of the accessories 46 that it carries, and to hold the accessory gearbox 40 rigidly attached to the intermediate support casing 30.

The envelope 52 is formed mainly by a wall which may be cylindrical, with a circular, elliptical, ellipsoidal, square, rectangular, polygonal or other cross section. If necessary, the envelope 52 may comprise longitudinal and/or circumferential reinforcements to give it the desired stiffness. The reinforcements may be provided on the interior or, preferably, on the exterior of the wall of the envelope 52. The envelope may be metallic, made for instance of steel, titanium, aluminum or alloys comprising at least one of these metals, or of metal matrix composite or of organic matrix composite.

The envelope 52 may be attached to a circumferentially central part of the accessory gearbox 40, or more generally to a part such that the weight of the accessory gearbox 40 and of the accessories on either side of this part balance one another.

The envelope 52 may be linked to the accessory gearbox by bolting, by a V-Band type bracket or by any other mode of attachment that is sufficiently robust to allow the rigid attachment of the accessory gearbox 40 to the intermediate casing hub 30.

The transfer case 50 may be mounted against the upstream face 42 of the accessory gearbox. More particularly, the structural element 52, here the envelope, may be attached to the upstream face 42 of the accessory gearbox 40, for example via a bolted flange.

Due to these arrangements, the accessory gearbox 40, though attached to the intermediate casing hub 30, may be positioned downstream of the intermediate casing 30. Thus, in the present embodiment, the accessory gearbox 40 may be positioned axially at the compressor casing 60, more particularly at the high-pressure compressor casing, without however being attached to this compressor casing 60. Thus the phenomena of ovalization are avoided, especially when the compressor casing has a small size compared to the size of the fan or of the propeller.

Moreover, the assembly for an aircraft turbine engine 20 may comprise at least one arm 70, perhaps at least two arms 70, in this case exactly two arms 70. Unless otherwise stated, one of the arms 70 will be described hereinafter, the other possibly being identical or having other features, particularly among those mentioned.

The arm 70 connects the accessory gearbox 40 to the intermediate casing hub 30, in order to provide force transfer, for example axial force transfer, for example in tension. In this case, the two arms 70 are provided on either side of the envelope 52, so as to limit the oscillation of the accessory gearbox 40 around the area of attachment of the envelope 52 to the accessory gearbox 40.

The arm 70 is attached to the accessory gearbox 40 by a first connection 72 and to the intermediate casing hub 30 by a second connection 74. One and/or the other of the first connection 72 and of the second connection 74 may be articulated, so that the forces are transferred only in the axes of the arms (in tension or in compression).

For example, the first connection 72 may be a ball and socket connection.

For example, the second connection 74 may comprise a flexible stud, for example comprising a succession of metallic layers and layers of a prestressed elastomer.

These connections may be interchanged or made identical to one another, or still other connections may be used, for example bolted connections, associated in particular with means of adjusting the mounting of the arms to compensate for the statically indeterminate nature of the connection.

As illustrated in FIG. 2, the connection 72 may be provided on a peripheral surface of the accessory gearbox 40, or more generally on a surface that is distinct from the upstream face 42 and the downstream face 44, which leaves said faces available for the mounting of accessories.

Between the connections, the arm 70 may be a beam or a link, typically metallic or composite. The cross section of a beam or link of this type may be dimensioned by a person skilled in the art, for example with an H-shaped cross section or a hollow cross section, particularly with a circular, ellipsoidal, square or polygonal shape.

As illustrated, the assembly for an aircraft turbine engine 20 is bereft of other attachment between the accessory gearbox 40 and the intermediate casing hub 30 than the structural element 52, namely the envelope, and the two arms 70 previously described. Due to a mounting of this type, the attachment of the accessory gearbox 40 to the intermediate casing hub 30 is statically determinate. Other statically determinate mountings may however be contemplated.

Moreover, as revealed by FIG. 2, the connections 74 may be provided between successive openings 36, so that the arms 70 do not interfere with the discharge outlets of the compressor.

FIG. 3, which shows the turbine engine 10 in the operating portion, illustrates that the accessory gearbox 40 is attached to the intermediate casing hub 30 so as to be located mostly below the main axis X of the intermediate casing hub 30. In this case, the accessory gearbox 40 is mounted at 6 o'clock, at which it is suspended from the intermediate casing hub 30. This position, which facilitates under-wing maintenance and the recovery of fluids during operation and upon stopping the engine, and minimizes the risk of fire because possible leaks are removed by gravity, if necessary via the nacelle, makes the fact of not attaching the accessory gearbox 40 to the compressor casing 60 all the more advantageous.

Although the present description refers to specific exemplary embodiments, modifications can be made to these examples without departing from the general scope of the invention as defined by the claims. In addition, individual features of the different embodiments illustrated or mentioned can be combined into additional embodiments. Consequently, the description and the drawings should be considered in an illustrative, rather than a restrictive sense.

The invention claimed is:

1. An assembly for an aircraft turbine engine comprising an intermediate casing hub, an accessory gearbox, and a transfer case including a power transmission shaft configured to transmit mechanical power, taken off an engine shaft of the aircraft turbine engine, to at least one accessory mounted on the accessory gearbox, wherein the transfer case comprises a reinforced structural element surrounding the power transmission shaft and rigidly attaching the accessory gearbox to the intermediate casing hub, the assembly further comprising two arms connecting the accessory gearbox to the intermediate casing hub, the two arms being provided on both sides of the reinforced structural element, wherein the intermediate casing hub includes two or more openings, each of the two or more openings configured to allow a passage of discharge outlets of a compressor, and wherein each of the two arms is provided between successive openings.

2. The assembly for the aircraft turbine engine according to claim 1, wherein the accessory gearbox is formed by a housing which has an upstream face located downstream of the intermediate casing hub, and the reinforced structural element is rigidly attached to said upstream face.

3. The assembly for the aircraft turbine engine according to claim 1, the assembly being bereft of other attachment between the accessory gearbox and the intermediate casing hub than the reinforced structural element and said two arms.

4. The assembly for the aircraft turbine engine according to claim 1, wherein at least one of the two arms is attached to at least one of the intermediate casing hub and the accessory gearbox in an articulated manner so as to transfer forces only in tension.

5. The assembly for the aircraft turbine engine according to claim 1, wherein the reinforced structural element is formed by an envelope of the transfer case.

6. The assembly for the aircraft turbine engine according to claim 1, wherein the power transmission shaft extends substantially perpendicular to an upstream face of the accessory gearbox.

7. The assembly for the aircraft turbine engine according to claim 1, comprising the at least one accessory mounted on an upstream face of the accessory gearbox, said at least one accessory having an axial dimension smaller than a distance between said upstream face and a downstream annular flange of the intermediate casing hub.

8. The assembly for the aircraft turbine engine according to claim 1, wherein an attachment of the accessory gearbox to the intermediate casing hub is statically determinate.

9. The assembly for the aircraft turbine engine according to claim 1, wherein the intermediate casing hub comprises a downstream annular flange to which the reinforced structural element is attached, and the transfer case comprises an angle gearbox located in the intermediate casing hub upstream of the downstream annular flange, said angle gearbox connecting the power transmission shaft to the engine shaft of the aircraft turbine engine by means of a radial shaft of the aircraft turbine engine.

10. The assembly for the aircraft turbine engine according to claim 1, wherein the accessory gearbox is attached to the intermediate casing hub so as to be positioned, in an operating position, mostly below an axis of the intermediate casing hub.

11. The aircraft turbine engine comprising the assembly according to claim 1.

12. The aircraft turbine engine according to claim 11 comprising, downstream of an intermediate casing having the intermediate casing hub, a compressor casing and a combustion chamber casing, and wherein the assembly is bereft of attachment between the accessory gearbox and the compressor casing as well as the combustion chamber casing.

13. The assembly for the aircraft turbine engine according to claim 1, wherein the intermediate casing hub comprises an annular flange, wherein the annular flange includes the two or more openings.

14. The assembly for the aircraft turbine engine according to claim 1, wherein the reinforced structural element is sized to be able to support a weight of the accessory gearbox and of accessories carried by the accessory gearbox, relative to the intermediate casing hub.

15. The assembly for the aircraft turbine engine according to claim 1, wherein the two arms are connected to a surface of the accessory gearbox that is distinct from an upstream face and a downstream face of the accessory gearbox.

16. The assembly for the aircraft turbine engine according to claim 1, wherein a first arm of the two arms is attached to the accessory gearbox by a first connection, wherein the first arm of the two arms is attached to the intermediate casing hub by a second connection.

17. The assembly for the aircraft turbine engine according to claim 16, wherein the first connection is a ball and socket connection, and the second connection is a flexible stud.

18. The assembly for the aircraft turbine engine according to claim 1, wherein the intermediate casing hub includes a downstream annular flange extending radially inward from a downstream part of a frusto-conical portion of the intermediate casing hub.

19. The assembly for the aircraft turbine engine according to claim 1, wherein the intermediate casing hub includes an upstream annular flange extending radially inward from an upstream part of a frusto-conical portion of the intermediate casing hub.

20. An assembly for an aircraft turbine engine comprising an intermediate casing hub, an accessory gearbox, and a transfer case including a power transmission shaft configured to transmit mechanical power, taken off an engine shaft of the aircraft turbine engine, to at least one accessory mounted on the accessory gearbox, wherein the transfer case comprises a structural element surrounding the power transmission shaft and rigidly attaching the accessory gearbox to the intermediate casing hub, the assembly further comprising two arms connecting the accessory gearbox to the intermediate casing hub, the two arms being provided on both sides of the structural element, the assembly being bereft of other attachment between the accessory gearbox and the intermediate casing hub than the structural element and said two arms, wherein the intermediate casing hub includes two or more openings, each of the two or more openings configured to allow a passage of discharge outlets of a compressor, and wherein each of the two arms is provided between successive openings.

* * * * *